E. R. Beardsley,
Water Wheel.

No. 97,591.   Patented Dec. 7, 1869.

Witnesses
J. B. Turchin
G. A. Mariner

E. R. Beardsley
Inventor

United States Patent Office.

E. R. BEARDSLEY, OF AROMA, ILLINOIS.

Letters Patent No. 97,591, dated December 7, 1869.

IMPROVEMENT IN WATER-WHEELS.

The Schedule referred to in these Letters Patent and making part of the same.

*To all whom it may concern:*

Be it known that I, E. R. BEARDSLEY, of Aroma, in the county of Kankakee, and State of Illinois, have invented certain new and useful Improvements in "Turbine-Wheels;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1:
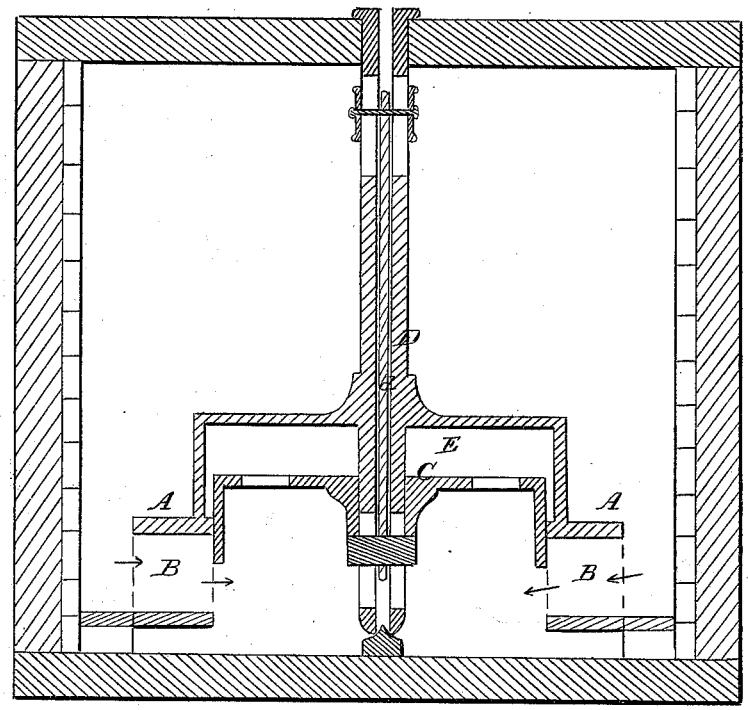
Figure 2:
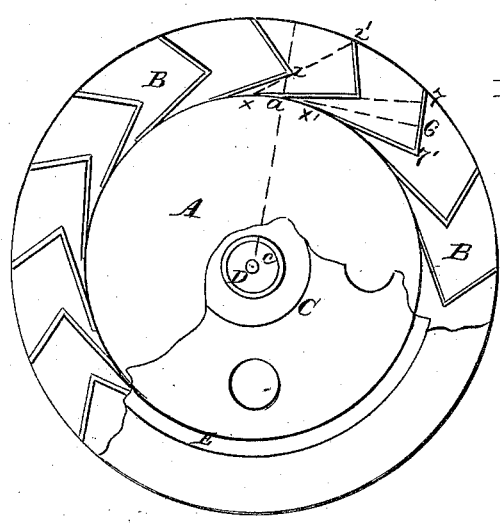

Figure 1 is the vertical section, and
Figure 2 is the ground plan of my turbine-wheel.

The nature of my invention consists in so arranging the buckets of the turbine-wheel as to obtain as much of the pressure of water upon the heel of the bucket as is practicably possible; also, in providing said turbine-wheel with a cylindrical gate, so constructed as to operate on the issues of the buckets of the said turbine-wheel.

A is the wheel, placed in a flume.

B B are the buckets. These are so constructed, that the line $a\ b$, perpendicular to radius $a\ c$, divides the space $x\ x'\ y\ y'$ in two equal parts, the result of which arrangement being, that the escape of water, at the issue $x\ x'$ of the bucket, relieves the wheel of pressure at that point, while, at the same time, the pressure remains on the heel of bucket at $y\ y'$.

In constructing bucket B, in the above-described manner, I prefer to place the points $x\ z\ z'$ in the same line, although slight deviations would not materially change the principle.

The pressure is calculated to be received simply from the weight of the column of water, resting on all sides, and against the wheel, and whose force depends upon the head or height of water above the wheel. Thus the scrolls or guides, and outside gates, generally used in connection with turbine and other wheels, are dispensed with, although they may be used with it, if desirable.

As the power of the wheel depends upon the amount of water used, or passing the issues $x\ x'$ of the buckets B, I regulate the closing and the opening of the same by the cylindrical gate C, placed inside of the wheel, and close to the issues $x\ x'$, so that when elevated or depressed, said gate opens or closes, to any desirable degree, the said issues.

When entirely elevated, the gate enters into the elevated recess or dome E, connected firmly with the rim of the wheel.

The elevation or depression of the gate may be produced by the rod $d$, placed in the hollow shaft D, and moved up or down, or the gate may be operated by any other suitable device.

The gate may be applied, also, to most of the turbine-wheels now in use; and, in case the issues of the buckets are placed on the outside of the rim of the wheel, the same gate may be adapted to the purpose, and, being placed on the outside of the wheel, would operate upon the issues in the manner above described.

What I claim as new, and desire to secure by Letters Patent, is—

The wheel A, having the case or dome E, the buckets B, and annular gate C, all constructed and arranged substantially as described.

E. R. BEARDSLEY.

Witnesses:
J. B. TURCHIN,
G. A. MARINER.